(12) United States Patent
Yamamoto et al.

(10) Patent No.: US 11,342,096 B2
(45) Date of Patent: May 24, 2022

(54) WIRING MEMBER WITH RESIN MOLDED PORTIONS AND BRACKET

(71) Applicant: Sumitomo Wiring Systems, Ltd., Mie (JP)

(72) Inventors: Hironobu Yamamoto, Mie (JP); Moriyuki Shimizu, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 22 days.

(21) Appl. No.: 16/572,981

(22) Filed: Sep. 17, 2019

(65) Prior Publication Data

US 2020/0105441 A1 Apr. 2, 2020

(30) Foreign Application Priority Data

Sep. 28, 2018 (JP) .............................. JP2018-183077

(51) Int. Cl.
| | | |
|---|---|---|
| *H01B 7/40* | (2006.01) | |
| *H01B 7/18* | (2006.01) | |
| *H01B 7/00* | (2006.01) | |
| *B60T 17/00* | (2006.01) | |
| *B60R 16/02* | (2006.01) | |

(52) U.S. Cl.
CPC .............. *H01B 7/40* (2013.01); *H01B 7/009* (2013.01); *H01B 7/1875* (2013.01); *B60R 16/0207* (2013.01); *B60T 17/00* (2013.01)

(58) Field of Classification Search
None
See application file for complete search history.

(56) References Cited

U.S. PATENT DOCUMENTS

| | | | | | |
|---|---|---|---|---|---|
| 1,718,537 | A | * | 6/1929 | De Reamer | H01B 7/0045 307/149 |
| 3,128,214 | A | * | 4/1964 | Lay | H01B 7/0045 264/258 |
| 3,417,362 | A | * | 12/1968 | Reynolds | H01R 12/81 439/77 |
| 4,797,512 | A | * | 1/1989 | Kumagai | H02G 15/18 174/135 |
| 5,004,194 | A | * | 4/1991 | Watanabe | F16L 55/035 248/74.5 |
| 5,016,842 | A | * | 5/1991 | Suzuki | B60R 16/0215 248/68.1 |

(Continued)

FOREIGN PATENT DOCUMENTS

| | | | |
|---|---|---|---|
| DE | 102018217580 A1 | * | 4/2020 |
| WO | WO-2016068008 A1 | * | 5/2016 ........... H02G 3/0406 |
| WO | WO-2021149514 A1 | * | 7/2021 |

*Primary Examiner* — Timothy J. Dole
*Assistant Examiner* — Muhammed Azam
(74) *Attorney, Agent, or Firm* — Honigman LLP

(57) ABSTRACT

A wiring member includes wires, a resin molded portion that covers the wires, and a bracket attachment that is attached to the resin molded portion. The resin molded portion includes a bracket attachment portion that is formed with at least one flat surface portion. The bracket includes a first attachment portion that is configured to be attached to an attachment location, and a second attachment portion that is connected to the first attachment portion and is crimped to the bracket attachment portion while being in surface contact with at least one of the at least one flat surface portion.

4 Claims, 4 Drawing Sheets

(56) References Cited

U.S. PATENT DOCUMENTS

| | | | | |
|---|---|---|---|---|
| 5,168,124 A | * | 12/1992 | Takase | H01R 4/70 174/23 R |
| 5,401,905 A | * | 3/1995 | Lesser | H02G 3/26 138/108 |
| 5,414,218 A | * | 5/1995 | Nathan | H01R 13/5816 174/140 R |
| 5,534,665 A | * | 7/1996 | Long | B60R 16/0215 174/68.1 |
| 5,536,904 A | * | 7/1996 | Kojima | H01B 7/285 156/48 |
| 5,895,889 A | * | 4/1999 | Uchida | B60R 16/0207 174/72 A |
| 5,954,538 A | * | 9/1999 | Huang | B60R 16/0207 439/502 |
| 6,027,679 A | * | 2/2000 | O'Brien | B60R 16/02 264/272.11 |
| 6,069,319 A | * | 5/2000 | Davis, Jr. | B29C 44/12 174/110 F |
| 6,120,327 A | * | 9/2000 | O'Brien | B29C 44/12 174/72 A |
| 6,229,091 B1 | * | 5/2001 | Ogawa | B60R 16/0215 174/72 A |
| 6,294,736 B1 | * | 9/2001 | Takeda | H02G 3/30 174/72 A |
| 6,300,561 B1 | * | 10/2001 | Saito | B60R 16/0207 174/507 |
| 6,330,746 B1 | * | 12/2001 | Uchiyama | G06F 30/15 29/872 |
| 6,376,774 B1 | * | 4/2002 | Oh | H01H 85/10 174/92 |
| 6,380,488 B1 | * | 4/2002 | Takeda | B60R 16/0215 174/135 |
| 6,398,170 B1 | * | 6/2002 | Wada | F16L 3/123 248/68.1 |
| 6,482,340 B1 | * | 11/2002 | Davis, Jr. | B29C 44/1219 264/272.11 |
| 6,505,876 B1 | * | 1/2003 | Watanabe | B60R 16/0207 296/208 |
| 8,003,888 B2 | * | 8/2011 | Owen, Sr. | H02G 15/08 174/135 |
| 8,128,126 B2 | * | 3/2012 | Poupore | F16L 41/023 285/131.1 |
| 9,022,807 B2 | * | 5/2015 | Uno | H01R 13/6592 439/607.55 |
| 2002/0019165 A1 | * | 2/2002 | Aoki | B60R 16/0207 439/502 |
| 2002/0023770 A1 | * | 2/2002 | Motokawa | B60R 16/0207 174/72 A |
| 2002/0028600 A1 | * | 3/2002 | Kondo | B60R 16/0207 439/502 |
| 2002/0067077 A1 | * | 6/2002 | Hentschel | B60R 16/0207 307/10.1 |
| 2003/0023947 A1 | * | 1/2003 | Sakakura | G06T 15/00 716/126 |
| 2003/0070830 A1 | * | 4/2003 | Kondo | B60R 16/0207 174/68.1 |
| 2004/0206540 A1 | * | 10/2004 | Frederick | B60R 16/0215 174/71 R |
| 2007/0049090 A1 | * | 3/2007 | Kaneko | B60R 16/0239 439/271 |
| 2007/0187144 A1 | * | 8/2007 | Kato | B60R 16/0215 174/72 A |
| 2009/0084578 A1 | * | 4/2009 | Irisawa | B60R 16/0215 174/135 |
| 2009/0167461 A1 | * | 7/2009 | Oiwa | B60R 16/0207 333/181 |
| 2010/0230157 A1 | * | 9/2010 | Sakata | B60R 16/0215 174/72 A |
| 2011/0308857 A1 | * | 12/2011 | Zapata | H01R 4/183 174/88 R |
| 2012/0103686 A1 | * | 5/2012 | Sekido | A61B 1/00 174/75 R |
| 2012/0261184 A1 | * | 10/2012 | Kitamura | B60R 16/0215 174/72 A |
| 2012/0298404 A1 | * | 11/2012 | Tokunaga | B60R 16/0215 174/135 |
| 2013/0118778 A1 | * | 5/2013 | Takahashi | B60R 16/0215 174/154 |
| 2015/0000971 A1 | * | 1/2015 | Suzuki | H02G 3/083 174/542 |
| 2015/0027778 A1 | * | 1/2015 | Murao | H02G 3/0481 174/72 A |
| 2015/0175095 A1 | * | 6/2015 | Inao | B60R 16/0207 174/720 |
| 2015/0329069 A1 | * | 11/2015 | Daugherty | B60R 16/0207 174/72 A |
| 2015/0355213 A1 | * | 12/2015 | Kobayashi | G01P 1/026 324/207.25 |
| 2016/0013625 A1 | * | 1/2016 | Suzuki | B60R 16/0215 174/72 A |
| 2016/0019998 A1 | * | 1/2016 | Kawaguchi | B60R 16/0215 174/72 A |
| 2016/0027553 A1 | * | 1/2016 | Murao | H01R 13/73 174/72 A |
| 2016/0156168 A1 | * | 6/2016 | Takeda | H02G 3/32 174/70 R |
| 2016/0190782 A1 | * | 6/2016 | Tsukamoto | H02G 3/0406 174/72 A |
| 2016/0365170 A1 | * | 12/2016 | Wakabayashi | B60R 16/0215 |
| 2016/0366796 A1 | * | 12/2016 | Wakabayashi | H05K 9/0098 |
| 2017/0313265 A1 | * | 11/2017 | Shimizu | B60R 16/0215 |
| 2017/0331263 A1 | * | 11/2017 | Matsumura | H01B 7/0045 |
| 2018/0040395 A1 | * | 2/2018 | Shimizu | H01B 13/01218 |
| 2018/0174705 A1 | * | 6/2018 | Sugino | H01B 7/0045 |
| 2018/0188569 A1 | * | 7/2018 | Lee | G02F 1/1343 |
| 2018/0330850 A1 | * | 11/2018 | Itou | H01B 13/012 |
| 2019/0071036 A1 | | 3/2019 | Shimizu et al. | |
| 2020/0094001 A1 | * | 3/2020 | Orphanos | A61M 13/003 |
| 2020/0111586 A1 | * | 4/2020 | Kim | H01B 7/2825 |
| 2020/0111587 A1 | * | 4/2020 | Kim | H01B 7/0045 |
| 2020/0168357 A1 | * | 5/2020 | Eshima | H01B 7/0045 |
| 2020/0223381 A1 | * | 7/2020 | Kobayashi | H01B 13/01209 |
| 2020/0262364 A1 | * | 8/2020 | Eshima | B60T 7/085 |

\* cited by examiner

WIRING MEMBER WITH RESIN MOLDED PORTIONS AND BRACKET

CROSS-REFERENCE TO RELATED APPLICATIONS

This application claims priority of Japanese Patent Application No. JP 2018-183077 filed on Sep. 28, 2018, the contents of which are incorporated herein.

TECHNICAL FIELD

The present disclosure relates to a wiring member.

BACKGROUND

JP 2016-91731A discloses a technique for crimping a bracket to a bracket attachment portion, which is formed around the periphery of a cable.

JP 2016-91731A is an example of related art.

In JP 2016-91731A, if the bracket attachment portion has a round shape, then the bracket may rotate around the periphery of the bracket attachment portion, and thus it may be difficult to regulate the angle of the bracket and the cable.

SUMMARY

An object of the present disclosure is to provide a technique with which it is possible to more favorably crimp a bracket to a bracket attachment portion.

In order to resolve the above-described problem, the wiring member according to a first aspect includes: a wire; a resin molded portion that includes a bracket attachment portion formed with at least one flat surface portion, and covers a periphery of the wire; and a bracket that includes a first attachment portion configured to be attached to an attachment location, and a second attachment portion that is connected to the first attachment portion and is crimped to the bracket attachment portion while being in surface contact with at least one of the at least one flat surface portion.

The wiring member according to a second aspect is the wiring member according to the first aspect, wherein the bracket attachment portion is formed such that a cross section thereof exhibits a quadrate shape and includes four flat surface portions, and the second attachment portion of the bracket is in surface contact with a plurality of the four flat surface portions.

The wiring member according to a third aspect is the wiring member according to the first and second aspects, wherein the wiring member includes a plurality of the wire, and further comprises a sheath that covers the plurality of wires, and the bracket attachment portion is formed to cover a periphery of the sheath.

The wiring member according to a fourth aspect is the wiring member according to the third aspect, wherein the resin molded portion covers an end portion of the sheath and a base end portion of the plurality of wires that extend from the end portion of the sheath.

With the above aspects, the second attachment portion of the bracket and the bracket attachment portion are in surface contact with each other by at least one flat surface, and therefore it becomes unlikely that the bracket will rotate around the periphery of the bracket attachment portion. Also, when the bracket is crimped, it is possible to regulate the angle of the first attachment portion and the wires on the basis of the flat surface portion, and therefore it is easy to regulate the angle of the wires and the first attachment portion of the bracket. Thus, it is possible to more favorably crimp the bracket to the bracket attachment portion.

With the second aspect, the second attachment portion of the bracket and the bracket attachment portion are in surface contact by a plurality of flat surfaces, and therefore it is even more unlikely that the bracket will rotate around the periphery of the bracket attachment portion.

With the third aspect, crimping force is first applied to the sheath rather than the wires, and therefore it is possible to inhibit the applied crimping force from deforming the wires.

With the fourth aspect, it is possible to waterproof the end portion of the sheath with use of the resin molded portion.

DETAILED DESCRIPTION OF PREFERRED EMBODIMENTS

Figure 1:
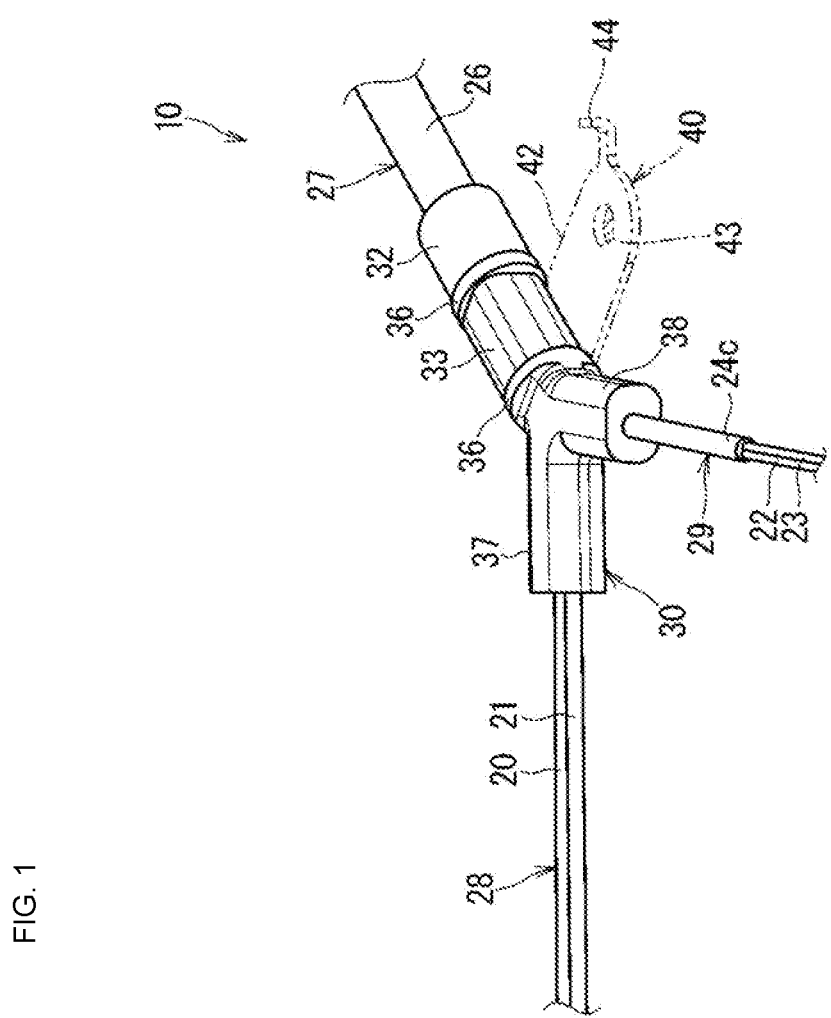
FIG. 1 is a perspective view showing a wiring member according to an embodiment.
Figure 2:
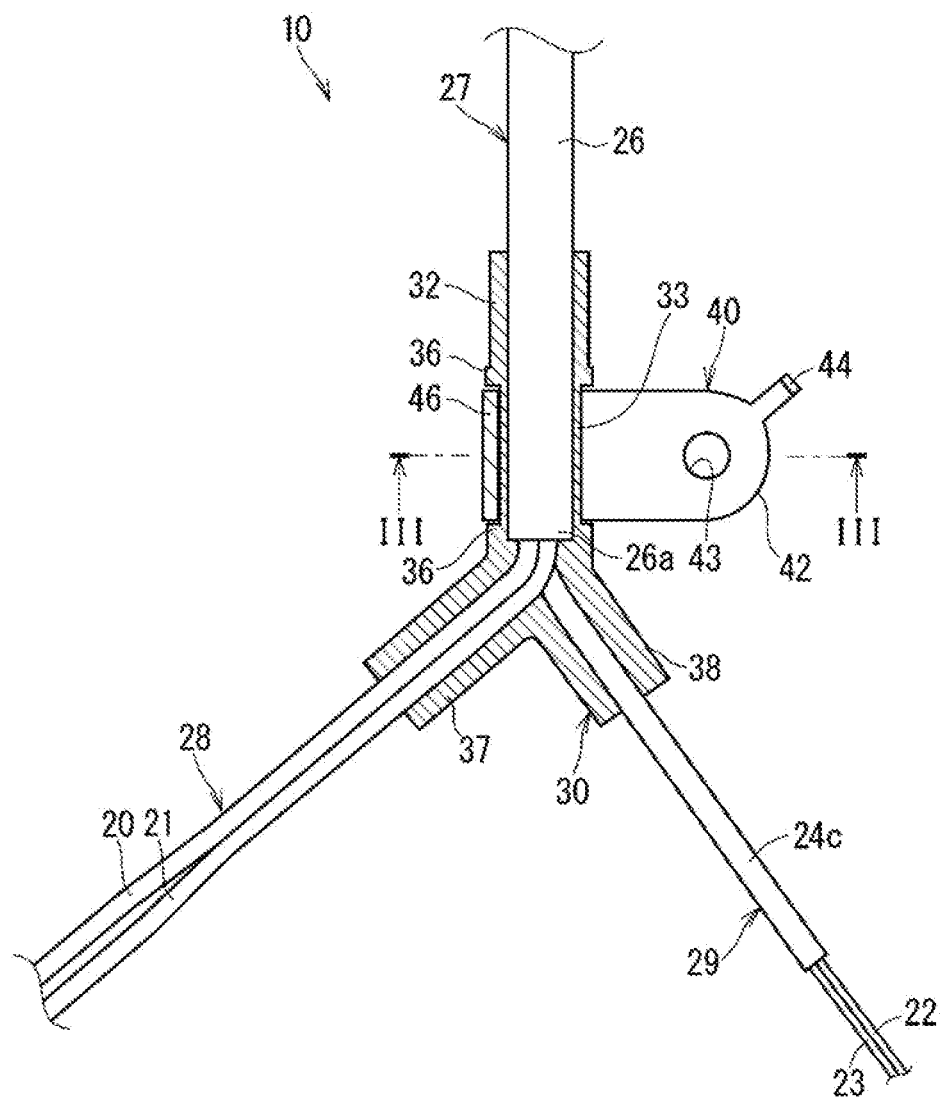
FIG. 2 is a vertical cross-sectional view showing the wiring member according to the embodiment.
Figure 3:
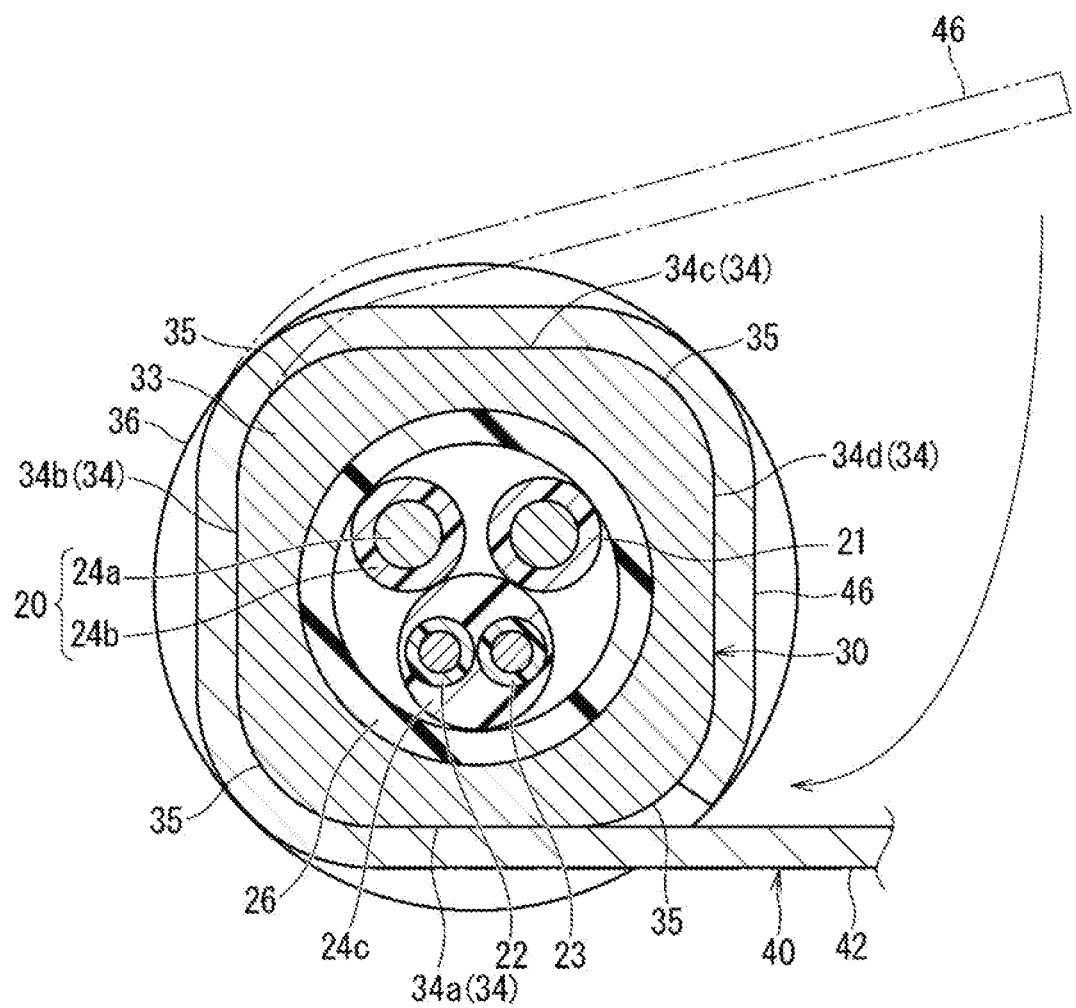
FIG. 3 is a horizontal cross-sectional view taken along a line III-III in FIG. 2.

The following is a description of a wiring member according to an embodiment. FIG. 1 is a perspective view showing a wiring member 10 according to the embodiment. FIG. 2 is a vertical cross-sectional view showing the wiring member 10 according to the embodiment. Note that FIG. 2 does not show the wires in cross-sectional view. FIG. 3 is a horizontal cross-sectional view taken along a line III-III in FIG. 2.

The wiring member 10 includes wires 20, 21, 22, and 23, a resin molded portion 30, and a bracket 40. Note that in FIG. 1, the bracket 40 is indicated by a two-dot chain line. Also, in FIG. 3, the position of the bracket 40 before being crimped is indicated by a two-dot chain line.

The wiring member 10 may include a single wire, or may include the plurality of wires 20, 21, 22, and 23. Here, an example will be described in which the wiring member 10 has the plurality of wires 20, 21, 22, and 23.

The wires 20 and 21 include core wires 24a and coatings 24b that cover the periphery of the core wires 24a. The core wires 24a are conductive wires that may be made from copper, a copper alloy, aluminum, an aluminum alloy, or the like. The core wires 24a may be single wires or may be stranded wires. The coatings 24b are insulating coatings that are made from a resin or the like, and may be formed by extrusion coating resin around the peripheries of the core wires 24a. The wires 20 and 21 may be power supply lines that transmit power, for example. If the wiring member 10 is installed in a vehicle for example, the wires 20 and 21 can serve as power supply lines that supply power to an EPB (Electric Parking Brake) or an EMB (Electro-Mechanical Brake). Note that FIGS. 1 and 2 omit the leading end portions of the wires 20 and 21.

The wires 22 and 23 include, similarly to the wires 20 and 21, the core wires 24a and the coatings 24b that cover the peripheries of the core wires 24a. The wires 22 and 23 may be signal lines that transmit signals, for example. If the wiring member 10 is installed in a vehicle for example, the wires 22 and 23 can serve as signal lines that transmit signals from an ABS (Anti-Lock Brake System) sensor (not shown) for detecting the speed of the vehicle. Note that FIGS. 1 and 2 omit the leading end portions of the wires 22 and 23.

The periphery of the plurality of wires 20, 21, 22, and 23 is covered by a sheath 26 (also referred to as a jacket). The sheath 26 is an insulating coating made from a resin or the like, and is formed by extrusion coating resin around the plurality of wires 20, 21, 22, and 23. The sheath 26 may be omitted.

The sheath 26 covers portions of the plurality of wires 20, 21, 22, and 23 that are towards one end thereof (portions closer to the top of FIG. 2). The sheath 26 includes an end portion from which the plurality of wires 20, 21, 22, and 23 are exposed, the end portion being located in an intermediate position of the plurality of wires 20, 21, 22, and 23 in the extending direction thereof. The plurality of wires 20, 21, 22, and 23 are bundled together by the sheath 26 in the portion in which the sheath 26 is provided.

The plurality of wires 20, 21, 22, and 23 extend from an end portion 26a of the sheath 26 and branch out in plurality therefrom. Here, the plurality of wires 20, 21, 22, and 23 branch out into two sets of wires, namely the wires 20 and 21, and the wires 22 and 23.

In the following description, the portion in which the ends of the previously-described wires 20, 21, 22, and 23 are bundled by the sheath 26 may be referred to as a main line portion 27. Also, the wires 20, 21, 22, and 23 extend from the end portion 26a of the sheath 26 and branch off therefrom, with the wires 20 and 21 branching off in one direction being referred to as a first branch portion 28, and the wires 22 and 23 branching off in another direction being referred to as a second branch portion 29. Here, the main line portion 27, the first branch portion 28, and the second branch portion 29 respectively extend in directions that intersect in the same plane, but the extending directions of the main line portion 27, the first branch portion 28, and the second branch portion 29 can be any direction. Also, the main line portion 27, the first branch portion 28, and the second branch portion 29 are not bent at any position other than the position at which they branch, but a configuration is also possible in which the main line portion 27, the first branch portion 28, and the second branch portion 29 each bend at a position other than the position at which they branch, and, furthermore, these bent portions are covered with the resin molded portion 30.

A coating layer 24c (also referred to as a sheath) is formed around the periphery of the wires 22 and 23. Accordingly, a cable is used as the wire that constitutes the second branch portion 29, the cable including the plurality of covered wires 22 and 23 and the coating layer 24c that covers the plurality of covered wires 22 and 23. The cable extends to the inside of the previously-described sheath 26. In contrast, the wires 20 and 21 that constitute the first branch portion 28 are used as separate wires. Accordingly, the sheath 26 covers three wires, namely the wires 20 and 21 which are separate wires, and the cable. Needless to say, a cable in which a plurality of covered wires are covered by the coating layer 24c may also be employed as the wire that constitutes the first branch portion 28. Also, a single or a plurality of covered wires that are not covered by the coating layer 24c, similarly to the wires 20 and 21 that constitute the first branch portion 28, may also be used as the wire that constitutes the second branch portion 29.

The resin molded portion 30 covers the end portion 26a of the sheath 26 and the base end portion of the plurality of wires 20, 21, 22, and 23 that branch off from the end portion 26a of the sheath 26. In other words, the resin molded portion 30 includes a main line covering portion 32 that covers the portion of the sheath 26 that is nearest to the end portion 26a thereof, a first branch covering portion 37 that covers the portion of the first branch portion 28 that is nearest to the end portion 26a of the sheath 26, and a second branch covering portion 38 that covers the portion of the second branch portion 29 that is nearest to the end portion 26a of the sheath 26.

A bracket attachment portion 33 and flange portions 36 are formed in the main line covering portion 32. The outer shape of the main line covering portion 32 is circular, except for the portion where the bracket attachment portion 33 is formed, but such a shape is not essential and the main line covering portion 32 may have a rectangular shape, for example.

The bracket attachment portion 33 is the portion to which the bracket 40 is to be crimped. The bracket attachment portion 33 is thinner than other portions of the main line covering portion 32. The bracket attachment portion 33 is formed such that a cross section thereof exhibits a quadrate shape, and includes four flat surface portions 34. When it is necessary to differentiate the four flat surface portions 34 from each other in the following description, they shall be referred to as flat surface portions 34a, 34b, 34c, and 34d. Note that in the example shown in FIG. 3, the cross section of the bracket attachment portion 33 is square shaped, but the bracket attachment portion 33 may also be rectangle shaped.

The bracket attachment portion 33 is formed such that a cross section thereof exhibits a quadrate shape, and includes corner portions 35. As shown in FIG. 3, the bracket attachment portion 33 is provided around the periphery of the circular sheath 26, and the thickness of the corner portions 35 is thicker than the thickness of the flat surface portions 34.

Here, the corner portions 35 are rounded. For this reason, when the bracket 40 is crimped, it is possible to inhibit the bend radius of the bracket 40 from becoming too small, even when the bracket 40 is bent around the corner portions 35. Note that there is no particular limitation to the curvature radius of the corner portion 35, and the curvature radius can be appropriately set.

The bracket attachment portion 33 is formed on the portion of the main line covering portion 32 that covers the sheath 26. Here in particular, the bracket attachment portion 33 is positioned closer to the middle portion than the edge of the end portion 26a of the sheath 26. Thus, the portion of the main line covering portion 32 that covers the edge of the end portion 26a of the sheath 26 can be made thicker.

The flange portions 36 are provided to join the bracket attachment portion 33. The flange portions 36 are provided on both sides of the bracket attachment portion 33. The flange portions 36 are formed to be thicker than the bracket attachment portion 33. Thus, movement of the bracket 40 that is crimped to the bracket attachment portion 33 in the direction in which the wires 20, 21, 22, and 23 extend is inhibited. Note that in the example shown in FIG. 1, the flange portions 36 are the thickest portions of the main line covering portion 32. Also, the flange portion 36 that is positioned closer to the leading end side of the wires 20, 21, 22, and 23 than the bracket attachment portion 33 is formed covering the edge of the end portion 26a of the sheath 26.

The first branch covering portion 37 and the second branch covering portion 38 are provided continuously with the flange portion 36 that is positioned on the leading end side of the main line covering portion 32. The first branch covering portion 37 and the second branch covering portion 38 extend in directions that intersect with each other. The first branch covering portion 37 regulates the direction in which the first branch portion 28 extends. The second branch covering portion 38 regulates the direction in which the second branch portion 29 extends. The first branch covering portion 37 and the second branch covering portion 38 each cover fewer of the wires 20, 21, 22, and 23 compared to the main line covering portion 32. Therefore, the first branch covering portion 37 and the second branch covering portion 38 are thinner than the main line covering portion 32.

The resin molded portion 30 keeps the wires 20, 21, 22, and 23 in a branched state (regulates their paths), and makes waterproofing and the like of the end portion 26a of the sheath 26 possible. In particular, portions of the resin molded portion 30 that are formed thick in comparison to the bracket attachment portion 33 primarily maintain the shape of (regulate the paths of) the branched portions of the wires 20, 21, 22, and 23, and waterproof the end portion 26a of the sheath 26.

The resin molded portion 30 such as that described above can, for example, be formed from a resin such as a urethane resin. Specifically, the resin molded portion 30 such as that described above can be formed as a single body through insert molding with use of an injection mold, with the end portion 26a of the main line portion 27, the base end portion of the first branch portion 28, and the base end portion of the second branch portion 29 of the sheath 26 being insert target portions. In other words, the resin molded portion 30 is a molded component. The resin molded portion 30 seals the opening of the end portion 26a of the sheath 26, in a state in which the resin molded portion 30 is in liquid-tight contact with the outer peripheral surface of the sheath 26, the outer peripheral surface of the first branch portion 28 (here, the outer peripheral surface of the coatings 24b of the wires 20 and 21), and the outer peripheral surface of the second branch portion 29 (here, the outer peripheral surface of the coating layer 24c).

The bracket 40 is a member for attaching the wiring member 10 to an attachment location. The attachment location may be a vehicle, for example. For example, if the wiring member 10 is installed in a vehicle and the wires 20, 21, 22, and 23 are used for an EPB, an EMB, or a sensor for detecting the rotational speed of the wheels, one end portion (portion before branching) (not shown) of the wiring member 10 is connected and fixed to a location on the body side of the vehicle, and the other end portions (the first branch portion 28 and the second branch portion 29) of the wiring member 10 are connected and fixed to a location on the wheel side of the vehicle. Also, the bracket 40 is attached to the body of the vehicle and supports the middle portion of the wiring member 10 at a fixed position.

The bracket 40 is crimped to the bracket attachment portion 33 of the resin molded portion 30. The bracket 40 includes a first attachment portion 42 and a second attachment portion 46 that is connected to the first attachment portion 42. The bracket 40 is a member that is formed as a single body from a resin or a metal, for example.

The first attachment portion 42 is a portion that is configured to be attached to an attachment location such as a vehicle. Here, the first attachment portion 42 employs a configuration in which the first attachment portion 42 is board-shaped and includes a through-hole 43 for attaching the wiring member 10 to the attachment location, the method of attachment being bolting or the like. Note that here, the first attachment portion 42 extends straight out from the second attachment portion 46, but it is also possible that the first attachment portion 42 bends at a portion that is connected to the second attachment portion 46, or bends at a point along the first attachment portion 42. It is also possible that the first attachment portion 42 bends in the front-and-rear direction of the principle surface of the plate member, or bends in the plane of the principle surface of the plate member. In other words, the first attachment portion 42 can extend in any direction relative to the wires 20, 21, 22, and 23, and the extending direction of the first attachment portion 42 can be appropriately set according to the positional relationship between the attachment location and routing paths of the wires 20, 21, 22, and 23, the position at which the bracket attachment portion 33 is to be attached relative to the wires 20, 21, 22, and 23, the orientation thereof, and the like.

Here, a protrusion 44 for detenting is formed on the first attachment portion 42. If the protrusion 44 is inserted into a recessed portion that is formed in the attachment location, then the first attachment portion 42 is inhibited from rotating about the axis of the bolt because the first attachment portion 42 is bolted to the attachment location with use of the through-hole 43. This protrusion 44 for detenting may also be omitted. Also, it is sufficient that the position and number of the protrusion 44 for detenting are appropriately set according to the recessed portion formed in the attachment location.

The shape of the first attachment portion 42 is not limited to the above-described shape that corresponds to bolting. It is sufficient that the shape of the first attachment portion 42 enables attachment to the attachment location and, for example, the first attachment portion 42 may be shaped like a clip that can be inserted into and locked to a hole portion that is formed in the attachment location.

The second attachment portion 46 is a portion for attaching the bracket 40 to the resin molded portion 30. The second attachment portion 46 is crimped to the bracket attachment portion 33. The second attachment portion 46 is board-shaped and crimped to the bracket attachment portion 33 so as to surround the four flat surface portions 34.

In the example shown in FIG. 3, the second attachment portion 46 is crimped so as to come into surface contact with each of the four flat surface portions 34. Naturally, the second attachment portion 46 may also be crimped so as to come into surface contact with a portion of the four flat surface portions 34. In this case, the second attachment portion 46 may be crimped to only one of the four flat surface portions 34, or may come into surface contact with a plurality of the flat surface portions 34.

If the second attachment portion 46 comes into surface contact with a portion of the four flat surface portions 34, then there is no particular limitation to the flat surface portions 34 that come in surface contact with the second attachment portion 46. For example, it is conceivable that the flat surface portion 34a that opposes the portion of the second attachment portion 46 that is connected to the first attachment portion 42 is in surface contact with the second attachment portion 46. In this case, it is easy to regulate the position and angle of the first attachment portion 42, relative to the wires 20, 21, 22, and 23. Also, for example, it is conceivable that the two flat surface portions 34a and 34c (34b and 34d), of the four flat surface portions 34, that face mutually opposing sides are in surface contact with the second attachment portion 46. In this case, the second attachment portion 46 sandwiches the two flat surface portions 34 and the portion between the two flat surface portions 34, and therefore it is easy to stabilize the crimped state of the second attachment portion 46.

The width of the second attachment portion 46 (the dimension in the extending direction of the main line portion 27) is the same or smaller (slightly smaller in this example)

than the length of the bracket attachment portion 33 (the dimension in the extending direction of the main line portion 27).

It is conceivable that the second attachment portion 46 of the bracket 40 may be gutter-shaped before crimping, as shown in FIG. 3. Therefore, when the bracket attachment portion 33 is accommodated inside the gutter, primarily the leading end portion, the base end portion, or both, of the second attachment portion 46 will be crimped and deformed. Thus, the second attachment portion 46 wraps around and supports the bracket attachment portion 33 and, as shown in FIG. 3, the bracket 40 becomes crimped to the bracket attachment portion 33.

At this time, in the portion at which the bracket 40 and the bracket attachment portion 33 are in surface contact by flat surfaces, the crimping force is dispersed over the flat surface portions 34, and thus it is possible to inhibit a large force from being applied locally to the wires 20, 21, 22, and 23, and it is possible to inhibit the applied crimping force from deforming the wires 20, 21, 22, and 23.

Also at this time, the corner portions 35 of the quadrate shaped bracket attachment portion 33 bulge outward, and therefore the crimping force tends to concentrate in the corner portions 35. The corner portions 35 are thicker than the flat surface portions 34. Thus, even if the crimping force is concentrated in the corner portions 35, it is unlikely that the force will be exerted on the wires 20, 21, 22, and 23, and it is possible to inhibit the applied crimping force from deforming the wires 20, 21, 22, and 23.

Figure 4:
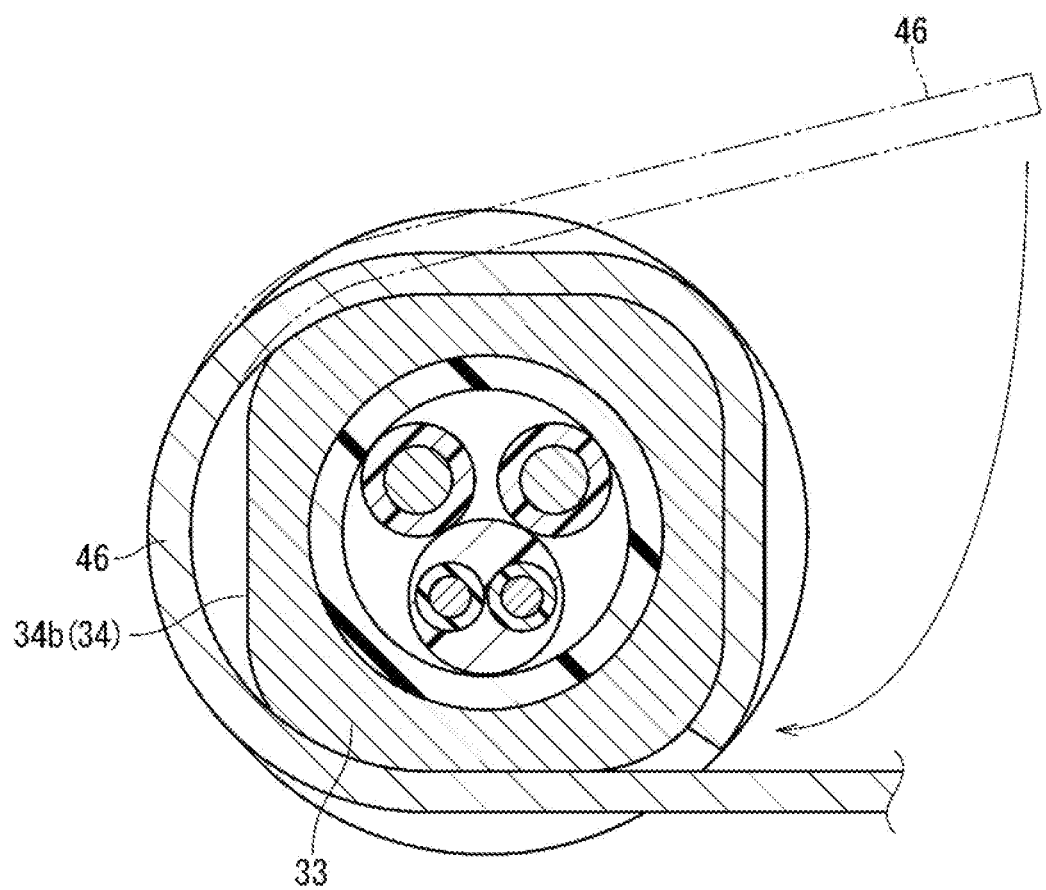
FIG. 4 is a horizontal cross-sectional view showing a variation of the bracket.

Also at this time, if the lower portion of the gutter (the portion that opposes the flat surface portion 34b in the example shown in FIG. 3) has a flat plate-shape that corresponds to the flat surface portions 34, it is easy to cause the lower portion of the gutter to come into surface contact with the flat surface portion 34 (the flat surface portion 34b in the example shown in FIG. 3). In contrast, in cases such as where the lower portion of the gutter of the bracket 40 is formed to exhibit an arc-shape in a horizontal cross-sectional view thereof as in the example shown in FIG. 4, it is possible that the lower portion of the gutter does not come into surface contact with the flat surface portion 34b.

Also at this time, it is possible to regulate the angle of the first attachment portion 42 and the wires 20, 21, 22, and 23 on the basis of the flat surface portions 34 (the flat surface portion 34a in the example shown in FIG. 3). Thus, it becomes easy to regulate the angle of the wires 20, 21, 22, and 23 and the first attachment portion 42 of the bracket 40.

Note that with the example shown in FIG. 3, the leading end edge portion of the second attachment portion 46 extends past the flat surface portion 34d and reaches the rounded corner portion 35. Naturally, the leading end edge portion of the second attachment portion 46 may also be positioned on the flat surface portion 34d.

The second attachment portion 46 can have a flat opposing portion that opposes the flat surface portions 34, and a corner opposing portion that opposes the corner portion 35.

With the wiring member 10 configured as described above, the second attachment portion 46 of the bracket 40 and the bracket attachment portion 33 are in surface contact with each other by flat surfaces, and therefore it becomes unlikely that the bracket 40 will rotate around the periphery of the bracket attachment portion 33. Also, when the bracket 40 is crimped, it is possible to regulate the angle of the first attachment portion 42 and the wires 20, 21, 22, and 23 on the basis of the flat surface portions 34, and therefore it is easy to regulate the angle of the wires 20, 21, 22, and 23 and the first attachment portion 42 of the bracket 40. Thus, it is possible to more favorably crimp the bracket 40 to the bracket attachment portion 33.

Also, the second attachment portion 46 of the bracket 40 and the bracket attachment portion 33 are in surface contact by a plurality of flat surfaces, and therefore it is even more unlikely that the bracket will rotate around the periphery of the bracket attachment portion 33.

Also, the bracket attachment portion 33 is formed in a portion that covers the sheath 26, and therefore crimping force is first applied to the sheath 26 rather than the wires 20, 21, 22, and 23, and therefore it is possible to inhibit the applied crimping force from deforming the wires 20, 21, 22, and 23.

Also, the resin molded portion 30 covers the end portion 26a of the sheath 26 and the base end portion of the plurality of wires 20, 21, 22, and 23 that extend from the end portion 26a of the sheath 26, and therefore it is possible to waterproof the end portion 26a of the sheath 26 with use of the resin molded portion 30. In other words, it is possible to form a waterproofing portion and the bracket attachment portion 33 as a single body.

Variations

In the embodiment, a configuration is described in which the bracket attachment portion 33 is formed to have four flat surface portions 34, but such a configuration is not essential. There may be one flat surface portion 34, or there may be two or three flat surface portions 34. If there are two flat surface portions 34, the two flat surface portions 34 may be provided at positions that intersect each other, or may be provided at positions that face opposite sides to each other. If there are three or fewer flat surface portions 34, it is preferable that the portion of the first attachment portion 42 that is connected to the second attachment portion 46 is in surface contact with a flat surface portion 34. Thus, it becomes easy to regulate the position of the second attachment portion 46.

Also, the bracket attachment portion 33 in the embodiment is described as being formed to cover the periphery of the sheath 26, but such a configuration is not essential. For example, the bracket attachment portion 33 may be formed in a portion where the sheath 26 is not provided. At this time, it is possible that the wires 20, 21, 22, and 23 are not covered by the sheath 26 to begin with, or it is possible that, if the wires 20, 21, 22, and 23 are covered by the sheath 26, the bracket attachment portion 33 is formed in a portion where the sheath 26 is not provided with respect to the wires 20, 21, 22, and 23. Similarly, the bracket attachment portion 33 in the embodiment is described as being formed in the main line covering portion 32, but such a configuration is not essential. The bracket attachment portion 33 may, for example, be formed in a branch covering portion.

Also, the resin molded portion 30 in the embodiment is described as covering branching positions of the wires 20, 21, 22, and 23, but this configuration is not essential. The resin molded portion 30 may also cover a portion in which the wires 20, 21, 22, and 23 do not branch.

Also, the resin molded portion 30 is described in the embodiment as waterproofing the end portion 26a of the sheath 26, but such a configuration is not essential. Even if the resin molded portion 30 covers the branching positions of the wires 20, 21, 22, and 23, it is possible that the resin molded portion 30 does not function to waterproof the end portion 26a of the sheath 26.

Also, the wiring member 10 in the embodiment is described as including four wires, namely wires 20, 21, 22, and 23, but this configuration is not essential. The wiring member 10 may include three or fewer wires, or may include five or more wires. If the wiring member 10 includes five or more wires, for example, a configuration including five or more wires is possible in which EPB wires and EMB wires are both employed, a configuration including five or more wires is possible in which wires for active suspension are employed, and a configuration including five or more wires is possible in which wires for sensors are employed.

In the embodiment and variations described above, all of the plurality of wires may be power lines, or all of the plurality of wires may be signal lines. Also, if the plurality of wires are a combination of power lines and signal lines, any of the wires may be either power lines or signal lines.

Note that the configurations described in the foregoing embodiment and variations can be combined as appropriate as long as there are no mutual inconsistencies.

The above describes the present disclosure in detail, but the above description is an example in all respects, and the present disclosure is not limited thereto. It is to be understood that any number of variations not described herein are also encompassed within the scope of the present disclosure without departing from the scope of the present disclosure.

What is claimed is:

1. A wiring member comprising:
   a wire;
   a resin molded portion that includes a bracket attachment portion, a first branch covering portion, a second branch covering portion and a main line covering portion, the first branch covering portion and the second branch covering portion extending from a first end of the bracket attachment portion and angled away from each other, the main line covering portion extending from a second end of the bracket attachment portion so as to be opposite and spaced apart from the first branch covering portion and the second branch covering portion, the bracket attachment portion formed with a plurality of flat surface portions, and covers a periphery of the wire, the resin molded portion having a pair of flange portions, each of the pair of flange portions on opposite ends of the bracket attachment portion wherein one of the pair of flanges is disposed between the bracket attachment portion and the first branch covering portion and the second branch covering portion and the other of the pair of flanges is disposed between the bracket attachment portion and the main line covering portion; and
   a bracket that includes a first attachment portion configured to be attached to an attachment location, and a second attachment portion that is connected to the first attachment portion and is crimped to the bracket attachment portion while being in surface contact with at least one of the plurality of flat surface portions and seated between the pair of flange portions.

2. The wiring member according to claim 1, wherein the bracket attachment portion is formed such that a cross section thereof exhibits a quadrate shape and includes four flat surface portions, and
   the second attachment portion of the bracket is in surface contact with a plurality of the four flat surface portions.

3. The wiring member according to claim 1, wherein
   the wire is a plurality of wires, and
   further comprises a sheath that covers the plurality of wires, and
   the bracket attachment portion is formed to cover a periphery of the sheath.

4. The wiring member according to claim 3, wherein the resin molded portion covers an end portion of the sheath and a base end portion of the plurality of wires that extend from the end portion of the sheath.

* * * * *